T. W. ROLPH.
SHADE HOLDER.
APPLICATION FILED MAR. 12, 1920.
1,430,854.
Patented Oct. 3, 1922.
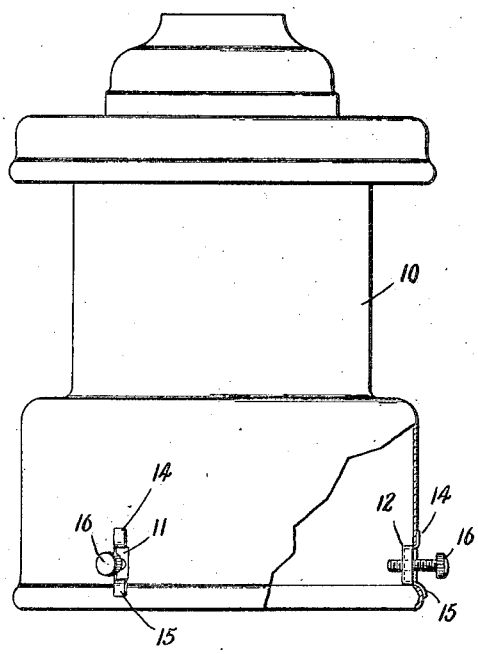
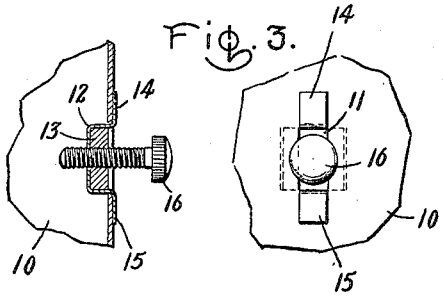
INVENTOR:
THOMAS W. ROLPH,
BY Albert G. Davis
HIS ATTORNEY.

Patented Oct. 3, 1922.

1,430,854

UNITED STATES PATENT OFFICE.

THOMAS W. ROLPH, OF SEBRING, OHIO, ASSIGNOR TO GENERAL ELECTRIC COMPANY, A CORPORATION OF NEW YORK.

SHADE HOLDER.

Application filed March 12, 1920. Serial No. 365,315.

*To all whom it may concern:*

Be it known that I, THOMAS W. ROLPH, a citizen of the United States, residing at Sebring, in the county of Mahoning, State of Ohio, have invented certain new and useful Improvements in Shade Holders, of which the following is a specification.

My invention relates to a method of holding set screws in porcelain enameled forms such as shades, reflectors and the like.

It has been the practice to hold set screws in loose clips which are held in place only when the set screw is in place. These particular clips are shown and described in Kulas Patent No. 1,198,931. The objection to these clips is that sometimes it is desirable to remove the screw entirely when putting the reflector in place; in that case, it is desireable to have a clip which holds the threaded portion in place whether the screw is in place or not. Sometimes this function is performed by threads carried in the form itself. This requires a heavy form or a steel piece fastened to the form before enameling, as the enamel tends to fill up the threads and while there are ways of keeping it out, they are not entirely successful.

According to my invention, an ordinary enameled steel form or reflector holder is provided having a small brass nut and a clip holding the nut to the form. The form is punched before enameling with a rectangular hole slightly wider than the screw hole in the nut and slightly longer than the width of the nut. The brass clip is so shaped that it holds the nut and prevents it from turning while two tabs pass through the hole and turn over, holding the nut tight against the enameled form.

My invention will be more clearly understood by referring to the accompanying drawing in which Fig. 1 shows an elevation of a holder embodying my invention; Fig. 2 is an enlarged vertical section; and Fig. 3 is a front elevation thereof.

In the drawing is shown a form of holder such as ordinarily used for supporting shades, reflectors and globes. This comprises a shell 10 which may be porcelain enameled, lacquered, or finished in any well known manner. Near the bottom edge of the shell 10 is a rectangular hole 11 which is punched in the shell before enameling. A metal clip 12 holds a nut 13 tight against the shell 10. This metal clip 12 is so shaped that it holds the nut 13 from turning while two tabs 14 and 15 pass through the hole 11 and turn over holding the nut 13 tight against the shell 10. A screw 16 fits into the threaded portion of the nut 13. The clip 12 will hold the nut 13 in place even though the screw 16 may be entirely out of the nut 13.

Various modifications of the above described device will readily suggest themselves to those skilled in the art and are to be considered as coming within the scope of my invention.

What I claim as new and desire to secure by Letters Patent of the United States is:

1. In a shade holder, the combination of a shell having an aperture therethrough, a nut disposed within said shell and registering with said aperture and nut-supporting means comprising a tab extending through said aperture and engaging the exterior of said shell and the rear surface of said nut.

2. In a shade holder, the combination of a shell having an aperture therethrough, a nut wider than said aperture disposed within said shell and having its aperture registering with that in the shell and nut supporting means comprising tabs extending through said aperture and engaging the exterior of said shell and the rear surface of said nut.

In witness whereof, I have hereunto set my hand this 9th day of March, 1920.

THOMAS W. ROLPH.